United States Patent
Zhao (10) Patent No.: US 11,800,042 B2
(45) Date of Patent: Oct. 24, 2023

(54) VIDEO PROCESSING METHOD, ELECTRONIC DEVICE AND STORAGE MEDIUM THEREOF

(71) Applicant: BAIDU ONLINE NETWORK TECHNOLOGY (BEIJING) CO., LTD, Beijing (CN)

(72) Inventor: Dexi Zhao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 350 days.

(21) Appl. No.: 17/337,920

(22) Filed: Jun. 3, 2021

(65) Prior Publication Data

US 2021/0385392 A1 Dec. 9, 2021

(30) Foreign Application Priority Data

Jun. 5, 2020 (CN) .......................... 202010504444.4

(51) Int. Cl.
*H04N 5/262* (2006.01)
*G06F 16/783* (2019.01)
(Continued)

(52) U.S. Cl.
CPC ....... *H04N 5/2621* (2013.01); *G06F 16/7834* (2019.01); *G06F 16/7844* (2019.01);
(Continued)

(58) Field of Classification Search
None
See application file for complete search history.

(56) References Cited

U.S. PATENT DOCUMENTS 10,467,792 B1 11/2019 Roche et al.
2003/0112259 A1 6/2003 Kinjo
(Continued)

FOREIGN PATENT DOCUMENTS

CN 101546587 A 9/2009
CN 101853668 A 10/2010
(Continued)

OTHER PUBLICATIONS

Notice of Allowance of Korean application No. KR10-2021-0072374 dated Apr. 5, 2023, 4 pages.
(Continued)

*Primary Examiner* — Mark T Monk
(74) *Attorney, Agent, or Firm* — Brooks Kushman P.C.

(57) ABSTRACT

A video processing method, an electronic device and a storage medium, which relates to the field of video recognition and understanding and deep learning, are disclosed. The method may include: during video play, for to-be-processed audio data, which has not been played, determined according to a predetermined policy, performing the following processing: extracting a word/phrase meeting a predetermined requirement from text content corresponding to the audio data, as a tag of the audio data; determining a special effect animation corresponding to the audio data according to the tag; and superimposing the special effect animation on a corresponding video picture for display when the audio data begins to be played.

20 Claims, 3 Drawing Sheets

(51) Int. Cl.
  *G06N 20/00* (2019.01)
  *G06F 16/78* (2019.01)
  *G06F 40/40* (2020.01)
  *G06N 3/08* (2023.01)
  *G06V 20/40* (2022.01)

(52) U.S. Cl.
  CPC .......... *G06F 16/7867* (2019.01); *G06F 40/40* (2020.01); *G06N 3/08* (2013.01); *G06N 20/00* (2019.01); *G06V 20/46* (2022.01)

(56) References Cited

U.S. PATENT DOCUMENTS

| | | | |
|---|---|---|---|
| 2004/0267899 A1 | 12/2004 | Rahman et al. | |
| 2009/0147009 A1 | 6/2009 | Tanaka et al. | |
| 2014/0178049 A1* | 6/2014 | Kihara | H04N 5/262 386/280 |
| 2017/0047096 A1 | 2/2017 | Li | |
| 2017/0316807 A1 | 11/2017 | Herkert-Oakland et al. | |

FOREIGN PATENT DOCUMENTS

| | | | |
|---|---|---|---|
| CN | 104394324 | A | 3/2015 |
| CN | 104703043 | A | 6/2015 |
| CN | 104754394 | A | 7/2015 |
| CN | 104780459 | A | 7/2015 |
| CN | 106096062 | A | 11/2016 |
| CN | 106127829 | A | 11/2016 |
| CN | 106446135 | A | 2/2017 |
| CN | 107493442 | A | 12/2017 |
| CN | 107967706 | A | 4/2018 |
| CN | 108307229 | A | 7/2018 |
| CN | 108764304 | A | 11/2018 |
| CN | 108877838 | A | 11/2018 |
| CN | 109147825 | A | 1/2019 |
| CN | 109729297 | A | 5/2019 |
| CN | 109996026 | A | 7/2019 |
| CN | 110008922 | A | 7/2019 |
| CN | 110830852 | A | 2/2020 |
| CN | 108764304 | B | 3/2020 |
| EP | 1318658 | A2 | 6/2003 |
| JP | 2003244425 | A | 8/2003 |
| JP | 2010109989 | A | 5/2010 |
| JP | 2011250100 | A | 12/2011 |
| JP | 2016035607 | A | 3/2016 |
| KR | 101070026 | A | 10/2011 |
| KR | 20190129266 | A | 11/2019 |
| WO | 2020091930 | A1 | 5/2020 |

OTHER PUBLICATIONS

Search Report of Chinese application No. 2020105044444 dated Nov. 12, 2021, 4 pages.
Extended European Search Report of European application No. 21177202.5 dated Nov. 12, 2021, 9 pages.
Wang eat al., Electronic Design Engineering, No. 25, Sep. 20, 2017, vol. 18, Basic Android Sign Language Drawing Automatic Generation Software, Sign Language Animation Generation of Software Design based on Android, 13 pages.
Summons to Attend Oral Proceedings of European patent application No. 21177202.5 dated May 26, 2023, 10 pages.

* cited by examiner

FIG.4 though the present disclosure is described in detail with reference to foregoing embodiments, those skilled in the art should understand they still can modify technical solutions recited in foregoing embodiments or equivalently replace partial technical features therein. Any modifications, equivalent substitutions and improvements made within the spirit and principles of the present disclosure all should be included in the extent of protection of the present disclosure.

VIDEO PROCESSING METHOD, ELECTRONIC DEVICE AND STORAGE MEDIUM THEREOF

CROSS-REFERENCE TO RELATED APPLICATIONS

The present disclosure claims the priority and benefit of Chinese Patent Application No. 202010504444.4, filed on Jun. 5, 2020, entitled "VIDEO PROCESSING METHOD, APPARATUS ELECTRONIC DEVICE AND STORAGE MEDIUM." The disclosure of the above application is incorporated herein by reference in its entirety.

TECHNICAL FIELD

The present disclosure relates to computer application technologies, and particularly to the field of video recognition and understanding and deep learning, and more particularly to a video processing method, electronic device and storage medium.

BACKGROUND

Currently, most video applications or websites provide barrage as an interaction manner when the video is played. The barrage includes texts and emoticons etc. and may enhance the interaction among users. However, this manner cannot improve the display effect of the video picture itself.

SUMMARY

The present disclosure provides a video processing method, apparatus, electronic device and storage medium.

A video processing method, including: during video play, for to-be-processed audio data, which has not been played, determined according to a predetermined policy, performing the following processing: extracting a word/phrase meeting a predetermined requirement from text content corresponding to the audio data, as a tag of the audio data; determining a special effect animation corresponding to the audio data according to the tag; and superimposing the special effect animation on a corresponding video picture for display when the audio data begins to be played.

A video processing apparatus, including: a tag generating module configured for, during video play, for to-be-processed audio data, which has not been played, determined according to a predetermined policy, extracting a word/phrase meeting a predetermined requirement from text content corresponding to the audio data, as a tag of the audio data; an animation obtaining module configured for determining a special effect animation corresponding to the audio data according to the tag; and an animation displaying module configured for superimposing the special effect animation on a corresponding video picture for display when the audio data begins to be played.

An electronic device, including: at least one processor; and a memory communicatively connected with the at least one processor; and the memory stores instructions executable by the at least one processor, and the instructions are executed by the at least one processor to cause the at least one processor to implement the above-described method.

A non-transitory computer-readable storage medium storing instructions which, when the program is executed by a computer, cause the computer to carry out the above-described method.

It will be appreciated that the Summary part does not intend to indicate essential or important features of embodiments of the present disclosure or to limit the scope of the present disclosure. Other features of the present disclosure will be made apparent by the following description.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as being only exemplary. Therefore, those having ordinary skill in the art should recognize that various changes and modifications can be made to the embodiments described herein without departing from the scope and spirit of the disclosure. Also, for the sake of clarity and conciseness, depictions of well-known functions and structures are omitted in the following description.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
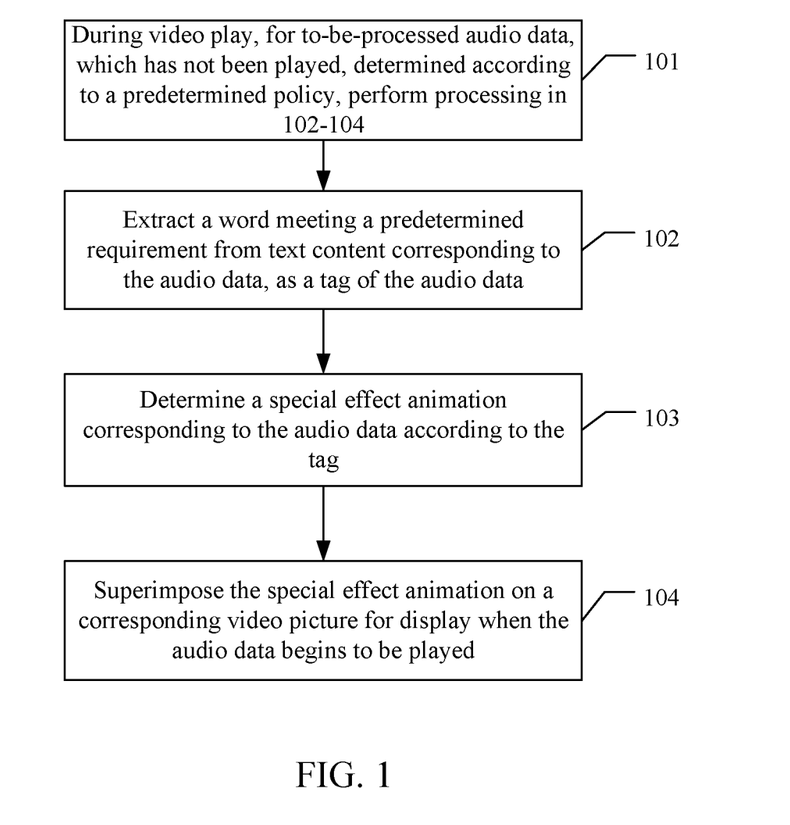
FIG. 1 illustrates a flow chart of a video processing method according to a first embodiment of the present disclosure.

FIG. 1 illustrates a flow chart of a video processing method according to a first embodiment of the present disclosure. As shown in FIG. 1, the method is specifically implemented in the following manner:

At 101, during video play, for to-be-processed audio data, which has not been played, determined according to a predetermined policy, process in 102-104 is performed.

At 102, a word/phrase meeting a predetermined requirement is extracted from text content corresponding to the audio data, as a tag of the audio data.

At 103, a special effect animation corresponding to the audio data is determined according to the tag.

At 104, the special effect animation is superimposed on a corresponding video picture for display when the audio data begins to be played.

For example, the video may be divided into M consecutive video segments with a predetermined time length, where M is a positive integer greater than one. The specific value of M may depend on actual needs. A segment of audio data may be selected from the audio data corresponding to each video segment according to the predetermined policy, as the to-be-processed audio data.

For example, while a certain video segment is played, a segment of audio data may be selected from the audio data corresponding to a next video segment, as the to-be-processed audio data, which may be processed in 102-104.

For example, the audio data corresponding to a sentence with the most complete semantics may be selected from the audio data corresponding to the video segment, as the to-be-processed audio data.

In the above manner, it is possible to avoid an excessive amount of audio data to be processed, which requires superimposition of excessive special effect animations and increases resource consumption.

Regarding the to-be-processed audio data, a word/phrase meeting a predetermined requirement may be extracted from text content corresponding to the audio data, as a tag of the audio data, and the text content corresponding to the audio data may be obtained through an audio recognition technique in the prior art.

For example, word segmentation processing may be performed for the text content. Regarding a/any word segmentation result, in response to determining that the word segmentation result is included in a pre-generated hotspot word/phrase list, the word segmentation result may be determined as a hotspot word/phrase, and therefore the word segmentation result may be taken as the tag of the audio data. The hotspot word list is, for example, generated manually or through automatic summarization and conclusion, and is updated periodically. It is determined whether a/any/each word segmentation result is included in the hotspot word/phrase list, and if the word segmentation result is included in the hotspot word/phrase list, the word segmentation result is, for example, taken as the tag of the audio data The hotspot word/phrase is usually content that draws the user's concern and interest, so the extraction of the hotspot word/phrase may make the special effect animation displayed to the user subsequently close to the user's actual needs.

The to-be-processed audio data may be input into a pre-trained scene recognition model to obtain a recognized scene corresponding to the audio data, and the scene may also be taken as the tag of the audio data. The scene recognition model may be pre-trained by machine learning or deep learning. The scene recognition model mainly recognizes audio environment sound. Usually, there is one recognition result, for example, sea wave, running water, windy, or firecracker, etc. For another example, the scene corresponding to the audio data may also be recognized according to the audio picture content corresponding to the audio data. A specific implementation mode is not limited.

The content and type of the tag of the audio data may be enriched through scene recognition.

Further, the special effect animation corresponding to the audio data may be determined according to the tag. For example, if there is only one tag, the special effect animation corresponding to the tag may be obtained directly, as the special effect animation corresponding to the audio data. If there are a plurality of tags, one tag may be selected from the plurality of tags first, and then the special effect animation corresponding to the selected one tag may be obtained as the special effect animation corresponding to the audio data.

When there is only one tag, the tag might be a hotspot word/phrase or a scene. No matter whether it is a hotspot word/phrase or a scene, the special effect animation corresponding to the tag may be obtained directly. When there are a plurality of tags, one tag may be first selected from the plurality of tags. How to select the tag is not limited herein.

For example, a priority level of the hotspot word/phrase may be set greater than that of the scene, and the priority level of a hotspot word/phrase appearing at a front position in the text content may be set to be higher than that of a hotspot word/phrase appearing later in the text content. According to the setting of priority levels, a tag with the highest priority level is selected. For another example, a priority level of a scene may be set greater than that of a hotspot word/phrase, and the priority level of a hotspot word/phrase appearing at a front position in the text content may be set to be higher than that of a hotspot word/phrase appearing later in the text content. According to the setting of priority levels, a tag with the highest priority level is selected. A specific implementation mode is not limited herein. Then, the special effect animation corresponding to the selected tag may be obtained.

When the special effect animation corresponding to a/any tag is obtained, if it is determined that the special effect animation corresponding to the tag is stored locally, the special effect animation corresponding to the tag may be obtained from the local; if it is determined that the special effect animation corresponding to the tag is not stored locally, the special effect animation corresponding to the tag may be obtained from a server, and then stored locally.

That is, the special effect animation is preferably obtained from the local to enhance the obtaining rate and efficiency. The special effect animation obtained from the server may be stored locally, so that the same special effect animation may be directly obtained from the local when it needs to be used next time.

If the special effect animation corresponding to a certain tag cannot be obtained from either the local or the server, a tag may be re-selected or it may be believed that the special effect animation corresponding to the audio data is empty (i.e., a special effect animation is not superimposed).

In the local or in the server, the tag is stored corresponding to a special effect animation, so that the special effect animation corresponding to the tag requested to be obtained can be determined conveniently and quickly.

Since the local storage space is limited, if a time length in which a/any special effect animation is stored locally exceeds a first predetermined time length, the special effect animation may be deleted from the local, and/or if a/any special effect animation is stored locally beyond a second predetermined time length and is not used, the special effect animation may also be deleted from the local. The specific values of the first predetermined time length and the second predetermined time length may be determined according to actual needs.

In the above manner, effective management and maintenance of the locally-stored special effect animation may be achieved so that the locally-stored special effect animation may be updated in time, and the hit rate of the locally-stored special effect animation may be enhanced.

Regarding the to-be-processed audio data, when the audio data begins to be played, the special effect animation corresponding to the audio data is superimposed on the corresponding video picture for display. That is, when the audio data begins to be played, the special effect animation begins to be displayed/shown/presented. The time length of the display of the special effect animation depends on the time length of the special effect animation itself. The time length of the special effect animation is usually short. For example, the time length of the audio data is 5 seconds, and the time length of the special effect animation is 3 seconds; the time when the audio data begins to be displayed is 3 minutes 18 seconds from the start of the whole video play duration; the special effect animation begins to be displayed from 3 minutes 18 seconds, and the display ends at 3 minutes 21 seconds. The special effect animation may be any form of animation such as a Lottie animation or a Webp animation.

When the special effect animation is displayed, an effect layer may be superimposed on the original video picture layer, and the special effect animation is displayed on the effect layer. The two layers are superimposed for display, so that whilst the video picture is played, the special effect animation is also displayed.

The display area of the special effect animation is not limited and depends on actual needs. For example, the display area may spread over the whole video picture area or over partial video picture area.

Figure 2:
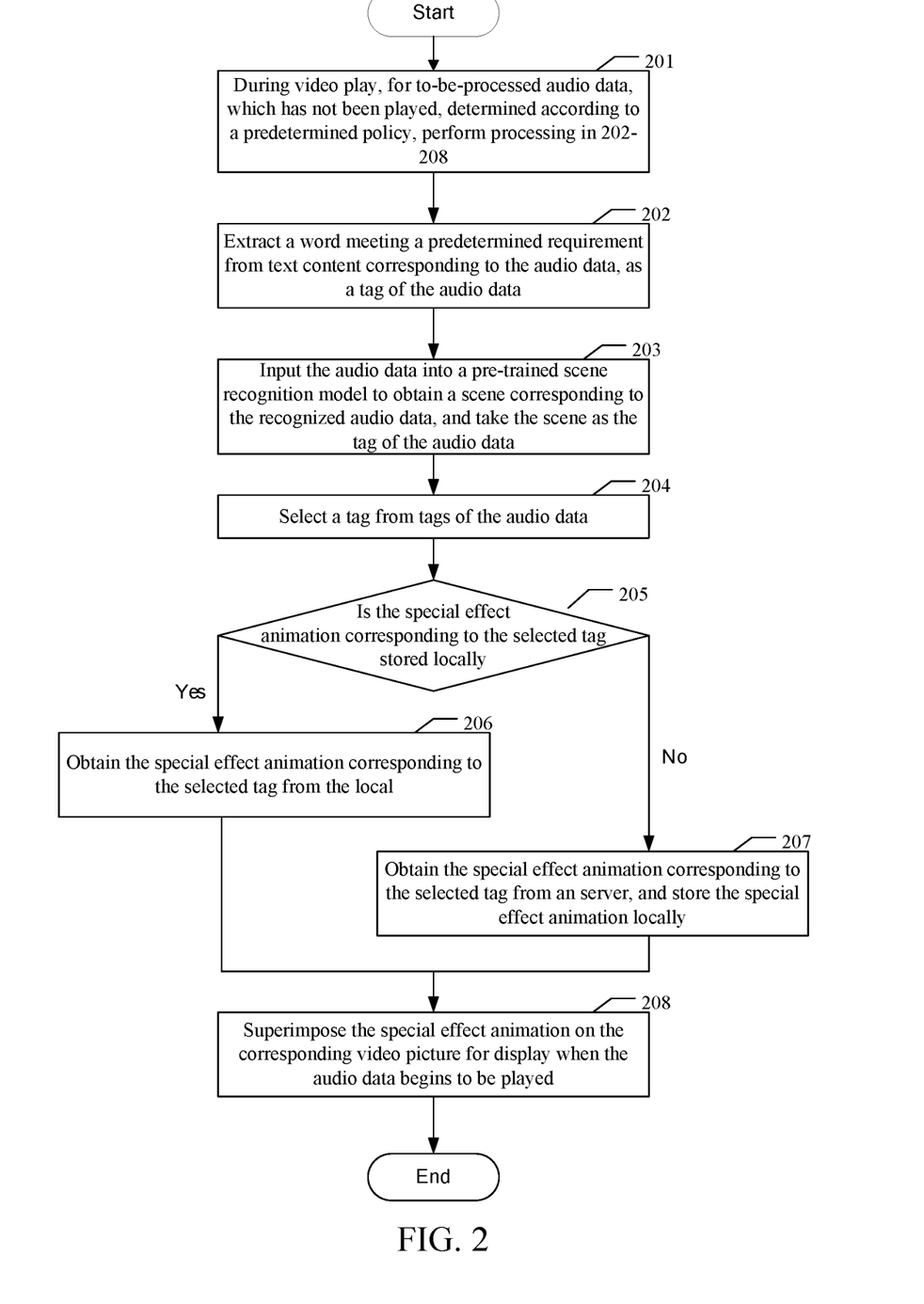
FIG. 2 illustrates a flow chart of a video processing method according to a second embodiment of the present disclosure.

Based on the above introduction, FIG. 2 illustrates a flow chart of a video processing method according to a second embodiment of the present disclosure. As shown in FIG. 2, the embodiment includes the following implementation mode:

At 201, during video play, for to-be-processed audio data, which has not been played, determined according to a predetermined policy, process in 202-208 is performed.

The video may be divided into M consecutive video segments with a predetermined time length, where M is a positive integer greater than one. A segment of audio data may be selected from the audio data corresponding to any video segment according to a predetermined policy, as the to-be-processed audio data. For example, the audio data corresponding to a sentence with the most complete semantics may be selected from the audio data corresponding to the video segment.

At 202, a word/phrase meeting a predetermined requirement is extracted from text content corresponding to the audio data, as a tag of the audio data.

The word segmentation processing may be performed for the text content. If it is determined that a/any word segmentation result is included in a pre-generated hotspot word/phrase list, the word segmentation result may be determined as a hotspot word/phrase, and thus the word segmentation result may be taken as the tag of the audio data.

At 203, the audio data is input into a pre-trained scene recognition model to obtain a recognized scene corresponding to the audio data, and the scene is taken as the tag of the audio data.

At 204, a tag is selected from a plurality of tags of the audio data.

At 205, determination is made as to whether the special effect animation corresponding to the selected tag is located locally, and if YES, 206 will be performed, or if NO, 207 will be performed.

At 206, the special effect animation corresponding to the selected tag is obtained from the local, and then 208 will be performed.

At 207, the special effect animation corresponding to the selected tag is obtained from the server, and stored locally, and then 208 will be performed.

At 208, when the audio data begins to be played, the special effect animation is superimposed on the corresponding video picture for display, and the flow ends.

It is to be noted that, the method according to some embodiments is described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description are merely exemplary embodiments, and the involved actions and modules are not necessarily requisite for the present disclosure.

According to the solution of the above method embodiment, during the play of the video, the corresponding special effect animation may be determined according to the audio data, and the special effect animation may be superimposed on the video picture for display, thereby improving the display effect of the video picture, enriching the content of the video picture and improving the interest of the video picture.

The method embodiment is introduced above. The solution of the present disclosure will be further described hereinafter through an apparatus embodiment.

Figure 3:
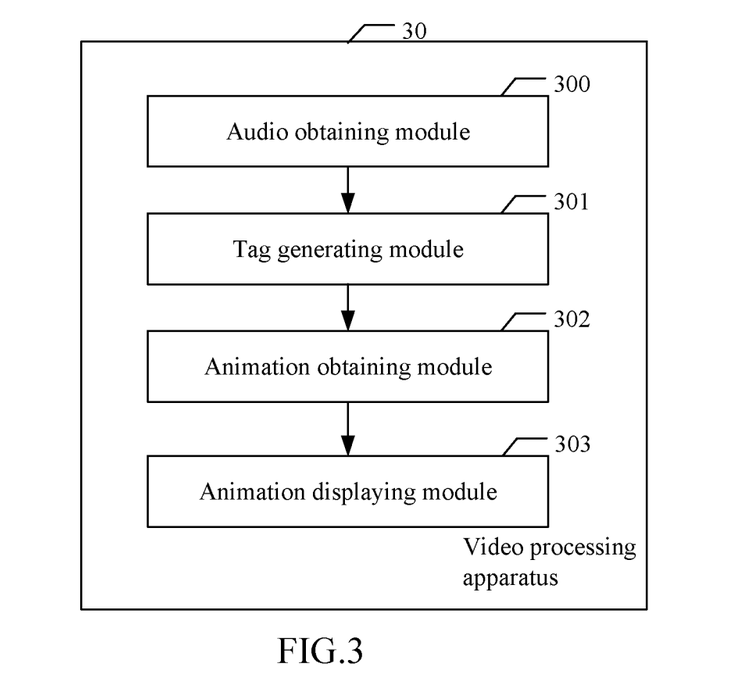
FIG. 3 illustrates a block diagram of a video processing apparatus 30 according to an embodiment of the present disclosure.

FIG. 3 illustrates a block diagram of a video processing apparatus 30 according to an embodiment of the present disclosure. As shown in FIG. 3, the apparatus includes a tag generating module 301, an animation obtaining module 302 and an animation displaying module 303.

The tag generating module 301 is configured for, during video play, for to-be-processed audio data, which has not been played, determined according to a predetermined policy, extracting a word/phrase meeting a predetermined requirement from text content corresponding to the audio data, as a tag of the audio data.

The animation obtaining module 302 is configured for determining a special effect animation corresponding to the audio data according to the tag.

The animation displaying module 303 is configured for superimposing the special effect animation on a corresponding video picture for display when the audio data begins to be played.

The apparatus shown in FIG. 3 may further includes: an audio obtaining module 300 configured for dividing the video into M consecutive video segments with a predetermined time length, where M is a positive integer greater than one, and selecting a segment of audio data from the audio data corresponding to each video segment according to the predetermined policy, as the to-be-processed audio data, for example, selecting the audio data corresponding to a sentence with the most complete semantics.

Regarding text content corresponding to the audio data, the tag generating module 301 may perform word segmentation processing for the text content, and determine the word segmentation result as a hotspot word/phrase in response to determining that the word segmentation result is included in a pre-generated hotspot word/phrase list, and taking the word segmentation result as the tag of the audio data.

The tag generating module 301 may input the audio data into a pre-trained scene recognition model to obtain a recognized scene corresponding to the audio data, and take the scene as the tag of the audio data.

Correspondingly, the tag of the audio data may include one or more tags. The animation obtaining module 302 may, in the case that the tag includes one tag, directly obtain the special effect animation corresponding to the tag, as the special effect animation corresponding to the audio data, and in the case that the tag includes a plurality of tags, select one tag from the plurality of tags, and obtain the special effect animation corresponding to the selected one tag as the special effect animation corresponding to the audio data.

In addition, when the special effect animation corresponding to any one tag needs to be obtained, the animation obtaining module 302 obtains the special effect animation corresponding to the tag from a local if the special effect animation corresponding to the tag is stored locally, the animation obtaining module 302 obtains the special effect animation corresponding to the tag from a server end if the special effect animation corresponding to the tag is not stored locally, and stores the special effect animation locally.

The animation obtaining module 302 may further be configured for deleting a special effect animation from the local if a time length in which the special effect animation is stored locally exceeds a first predetermined time length, and/or deleting a special effect animation from the local if a time length in which the special effect animation is stored locally exceeds a second predetermined time length and is not used.

Reference may be made to corresponding depictions in the aforesaid method embodiment for a specific workflow of the apparatus embodiment shown in FIG. 3. The workflow is not detailed any more.

In summary, according to the solution of the above apparatus embodiment, during the play of the video, a corresponding special effect animation may be determined according to the audio data, and the special effect animation may be superimposed on the video picture for display, thereby improving the display effect of the video picture, enriching the content of the video picture and improving the interest of the video picture; it is possible to, by dividing the video into video segments, avoid an excessive amount of audio data to be processed, which requires superimposition of excessive special effect animations and increases resource consumption; the hotspot word/phrase is usually content that draws the user's concern and interest, so the extraction of the hotspot word/phrase as the tag of the audio data may make the special effect animation displayed to the user subsequently close to the user's actual needs; the content and type of the tag of the audio data may be further enriched through scene recognition; when the special effect animation corresponding to the tag is obtained, it is preferably obtained from the local to enhance the obtaining rate and efficiency. The special effect animation obtained from the server may be stored locally, so that the same special effect animation may be directly obtained from the local when it needs to be used next time; in addition, effective management and maintenance of the locally-stored special effect animation may be achieved so that the locally-stored special effect animation may be updated in time, and the hit rate of the locally-stored special effect animation may be enhanced.

According to an embodiment of the present disclosure, the present disclosure further provides an electronic device and a readable storage medium.

Figure 4:
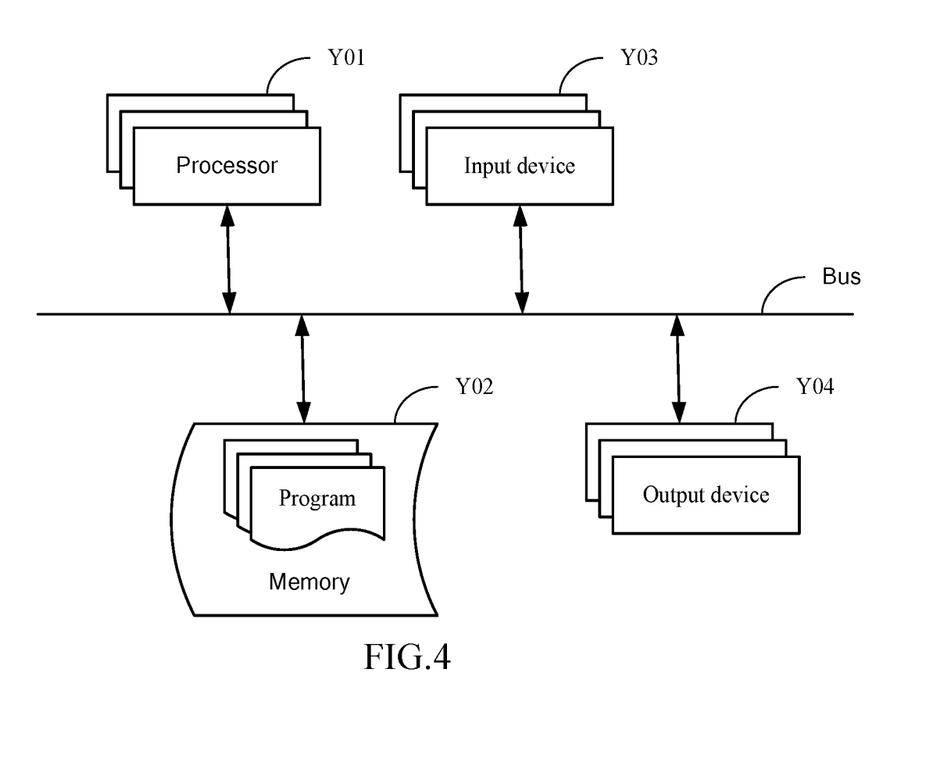
FIG. 4 illustrates a block diagram of an electronic device for implementing the method according to an embodiment of the present disclosure.

As shown in FIG. 4, it shows a block diagram of an electronic device for implementing the method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosures described and/or claimed in the text here.

As shown in FIG. 4, the electronic device includes: one or more processors Y01, a memory Y02, and interfaces configured to connect components and including a high-speed interface and a low speed interface. Each of the components are interconnected using various buses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor Y01 is taken as an example in FIG. 4.

The memory Y02 is a non-transitory computer-readable storage medium provided by the present disclosure. The memory stores instructions executable by at least one processor, so that the at least one processor executes the method according to the present disclosure. The non-transitory computer-readable storage medium of the present disclosure stores computer instructions, which are used to cause a computer to execute the method according to the present disclosure.

The memory Y02 is a non-transitory computer-readable storage medium and can be used to store non-transitory software programs, non-transitory computer executable programs and modules, such as program instructions/modules corresponding to the method according to embodiments of the present disclosure. The processor Y01 executes various functional applications and data processing of the server, i.e., implements the method according to embodiments of the present disclosure, by running the non-transitory software programs, instructions and modules stored in the memory Y02.

The memory Y02 may include a storage program region and a storage data region, and the storage program region may store an operating system and an application program needed by at least one function; the storage data region may store data created by the use of the electronic device. In addition, the memory Y02 may include a high-speed random access memory, and may also include a non-transitory memory, such as at least one magnetic disk storage device, a flash memory device, or other non-transitory solid-state storage device. In some embodiments, the memory Y02 may optionally include a memory remotely arranged relative to the processor Y01, and these remote memories may be connected to the electronic device via a network. Examples of the above network include, but are not limited to, the Internet, an intranet, a local area network, a mobile communication network, and combinations thereof.

The electronic device may further include an input device Y03 and an output device Y04. The processor Y01, the memory Y02, the input device Y03 and the output device Y04 may be connected through a bus or in other manners. In FIG. 4, the connection through the bus is taken as an example.

The input device Y03 may receive inputted numeric or character information and generate key signal inputs related to user settings and function control of the electronic device for implementing the point cloud data processing method according to embodiments of the present disclosure, and may be an input device such as a touch screen, keypad, mouse, trackpad, touchpad, pointing stick, one or more mouse buttons, trackball and joystick. The output device Y04 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A video processing method, comprising:
   during video play, for to-be-processed audio data, which has not been played, determined according to a predetermined policy, performing the following processing:
   extracting a word/phrase meeting a predetermined requirement from text content corresponding to the audio data, as a tag of the audio data;
   determining a special effect animation corresponding to the audio data according to the tag; and
   superimposing the special effect animation on a corresponding video picture for display when the audio data begins to be played.

2. The method of claim 1, wherein the extracting a word/phrase meeting a predetermined requirement from text content corresponding to the audio data, as a tag of the audio data comprises:
   performing word segmentation processing for the text content;
   determining a word segmentation result as a hotspot word/phrase in response to determining that the word segmentation result is included in a pre-generated hotspot word list, and
   taking the word segmentation result as the tag of the audio data.

3. The method of claim 1, further comprising:
   inputting the audio data into a pre-trained scene recognition model to obtain a recognized scene corresponding to the audio data, and taking the scene as the tag of the audio data.

4. The method of claim 3, wherein the scene recognition model comprises a scene recognition model trained by a deep learning method.

5. The method of claim 3, wherein the determining a special effect animation corresponding to the audio data according to the tag comprises:
   in the case that the tag comprises one tag, obtaining the special effect animation corresponding to the tag, as the special effect animation corresponding to the audio data; and
   in the case that the tag comprises a plurality of tags, selecting one tag from the plurality of tags, and obtaining the special effect animation corresponding to the selected one tag as the special effect animation corresponding to the audio data.

6. The method of claim 5, wherein obtaining the special effect animation corresponding to any one tag comprises:
   obtaining the special effect animation corresponding to the tag from a local if the special effect animation corresponding to the tag is stored locally; and
   obtaining the special effect animation corresponding to the tag from a server if the special effect animation corresponding to the tag is not stored locally, and storing the special effect animation locally.

7. The method of claim 6, further comprising:
deleting a special effect animation from the local if a time length in which the special effect animation is stored locally exceeds a first predetermined time length; and/or
deleting a special effect animation from the local if a time length in which the special effect animation is stored locally exceeds a second predetermined time length and is not used.

8. The method of claim 1, wherein the to-be-processed audio data is determined by:
dividing the video into M consecutive video segments with a predetermined time length, where M is a positive integer greater than one;
selecting a segment of audio data from the audio data corresponding to each video segment according to the predetermined policy, as the to-be-processed audio data.

9. The method of claim 8, wherein the selecting a segment of audio data according to the predetermined policy comprises:
selecting the audio data corresponding to a sentence with the most complete semantics.

10. An electronic device, comprising:
at least one processor; and
a memory communicatively connected with the at least one processor; wherein,
the memory stores instructions executable by the at least one processor, and the instructions are executed by the at least one processor to cause the at least one processor to carry out a video processing method, which comprises:
during video play, for to-be-processed audio data, which has not been played, determined according to a predetermined policy, performing the following processing:
extracting a word/phrase meeting a predetermined requirement from text content corresponding to the audio data, as a tag of the audio data;
determining a special effect animation corresponding to the audio data according to the tag; and
superimposing the special effect animation on a corresponding video picture for display when the audio data begins to be played.

11. The electronic device of claim 10, wherein the extracting a word/phrase meeting a predetermined requirement from text content corresponding to the audio data, as a tag of the audio data comprises:
performing word segmentation processing for the text content;
determining a word segmentation result as a hotspot word/phrase in response to determining that the word segmentation result is included in a pre-generated hotspot word list, and
taking the word segmentation result as the tag of the audio data.

12. The electronic device of claim 10, wherein the method further comprises:
inputting the audio data into a pre-trained scene recognition model to obtain a recognized scene corresponding to the audio data, and taking the scene as the tag of the audio data.

13. The electronic device of claim 12, wherein the scene recognition model comprises a scene recognition model trained by a deep learning method.

14. The electronic device of claim 12, wherein the determining a special effect animation corresponding to the audio data according to the tag comprises:
in the case that the tag comprises one tag, obtaining the special effect animation corresponding to the tag, as the special effect animation corresponding to the audio data; and
in the case that the tag comprises a plurality of tags, selecting one tag from the plurality of tags, and obtaining the special effect animation corresponding to the selected one tag as the special effect animation corresponding to the audio data.

15. The electronic device of claim 14, wherein obtaining the special effect animation corresponding to any one tag comprises:
obtaining the special effect animation corresponding to the tag from a local if the special effect animation corresponding to the tag is stored locally; and
obtaining the special effect animation corresponding to the tag from a server if the special effect animation corresponding to the tag is not stored locally, and storing the special effect animation locally.

16. The electronic device of claim 15, wherein the method further comprises:
deleting a special effect animation from the local if a time length in which the special effect animation is stored locally exceeds a first predetermined time length; and/or
deleting a special effect animation from the local if a time length in which the special effect animation is stored locally exceeds a second predetermined time length and is not used.

17. The electronic device of claim 10, wherein the to-be-processed audio data is determined by:
dividing the video into M consecutive video segments with a predetermined time length, where M is a positive integer greater than one;
selecting a segment of audio data from the audio data corresponding to each video segment according to the predetermined policy, as the to-be-processed audio data.

18. The electronic device of claim 17, wherein the selecting a segment of audio data according to the predetermined policy comprises:
selecting the audio data corresponding to a sentence with the most complete semantics.

19. A non-transitory computer-readable storage medium storing instructions which, when the program is executed by a computer, cause the computer to carry out a video processing method, which comprises:
during video play, for to-be-processed audio data, which has not been played, determined according to a predetermined policy, performing the following processing:
extracting a word/phrase meeting a predetermined requirement from text content corresponding to the audio data, as a tag of the audio data;
determining a special effect animation corresponding to the audio data according to the tag; and
superimposing the special effect animation on a corresponding video picture for display when the audio data begins to be played.

20. The non-transitory computer-readable storage medium of claim 19, wherein the extracting a word/phrase meeting a predetermined requirement from text content corresponding to the audio data, as a tag of the audio data comprises:
performing word segmentation processing for the text content;
determining a word segmentation result as a hotspot word/phrase in response to determining that the word segmentation result is included in a pre-generated hotspot word list, and taking the word segmentation result as the tag of the audio data.

\* \* \* \* \*